United States Patent
Imai et al.

(10) Patent No.: US 6,644,130 B2
(45) Date of Patent: Nov. 11, 2003

(54) ULTRASONIC FLOW METER HAVING A TUBULAR ELASTIC TRANSDUCER HOLDING UNIT

(75) Inventors: Hiroshi Imai, Gyoda (JP); Akira Takada, Gyoda (JP)

(73) Assignee: Surpass Industry Co., Ltd., Gyoda (JP)

( * ) Notice: Subject to any disclaimer, the term of this patent is extended or adjusted under 35 U.S.C. 154(b) by 0 days.

(21) Appl. No.: 10/061,894

(22) Filed: Feb. 1, 2002

(65) Prior Publication Data

US 2002/0104385 A1 Aug. 8, 2002

(30) Foreign Application Priority Data

| Feb. 5, 2001 | (JP) | ................................. 2001-028290 |
| Jan. 10, 2002 | (JP) | ................................. 2002-003892 |

(51) Int. Cl.$^7$ ................................. G01F 1/66
(52) U.S. Cl. ................................. 73/861.27
(58) Field of Search ................. 73/861.27, 861.28, 73/861.29; 24/22, 16 PB; 285/21.1, 21.2, 93, 369; 248/74.1, 74.2, 74.3

(56) References Cited

U.S. PATENT DOCUMENTS

| 3,987,674 A | * | 10/1976 | Baumoel | ................. 73/861.28 |
| 4,274,662 A | * | 6/1981 | de Groot et al. | ........... 285/21.1 |
| 4,454,767 A | * | 6/1984 | Shinkai et al. | ........... 73/861.18 |
| 5,131,279 A | * | 7/1992 | Lang et al. | ............... 73/861.27 |
| 5,179,862 A | * | 1/1993 | Lynnworth | ............... 73/861.28 |
| 5,282,388 A | * | 2/1994 | Czajkowski | ............. 73/861.28 |
| 5,357,810 A | * | 10/1994 | Czajkowski | ............. 73/861.28 |
| 6,418,796 B1 | * | 7/2002 | Baumoel | ................. 73/861.28 |

* cited by examiner

Primary Examiner—Edward Lefkowitz
Assistant Examiner—Carey D. Mack
(74) Attorney, Agent, or Firm—Kolisch Hartwell, P.C.

(57) ABSTRACT

The ultrasonic flow meter of the present invention comprising a measuring pipe through which liquid flows, and two measuring units provided at an interval in the lengthwise direction on measuring pipe. A tightly adhered tube having elasticity is attached to an attaching indentation formed in the measuring pipe over the peripheral direction, and its inner peripheral surface is tightly adhered to the outer peripheral surface of measuring pipe. A transducer is arranged on the outer peripheral surface of tightly adhered tube in the state in which it is pressed against the outer peripheral surface of the tightly adhered tube. In this ultrasonic flow meter, the transmission of vibrations between the transducer and fluid inside the measuring pipe can be carried out uniformly.

12 Claims, 4 Drawing Sheets

ULTRASONIC FLOW METER HAVING A TUBULAR ELASTIC TRANSDUCER HOLDING UNIT

BACKGROUND OF THE INVENTION

1. Field of the Invention

The present invention relates to an ultrasonic flow meter that measures the flow volume of a liquid flowing through a pipe using ultrasonic waves.

2. Description of the Related Art

An ultrasonic flow meter is known in the prior art that uses ultrasonic waves to function as a flow meter that measures the flow volume of a liquid flowing through a pipe.

This ultrasonic flow meter provides two measuring units having a transducer and provided at an interval in the lengthwise direction on a measuring pipe through which liquid flows. Ultrasonic waves are emitted from one of the transducers which are then received by the other transducer. Alternatively, ultrasonic waves are emitted from the other transducer and then received by the first transducer. The flow rate of the liquid in the measuring pipe is determined from the difference in propagation times of these ultrasonic waves, and flow volume is then measured from this flow rate.

However, although this ultrasonic flow meter has the transducer formed into the shape of a ring and fixed to the measuring pipe inserted into the transducer by adhesive, or has the transducer formed into the shape of a circular arc fixed to the outer periphery of the measuring pipe by adhesive, in these types of structures, there is a risk of variation occurring in the thickness of the adhesive layer in the gap between the transducer and measuring pipe, and in such case, the characteristics of the measurement data fluctuate which causes problems in accurate measurement of flow volume.

Moreover, in a case of such a structure in which the transducer is adhered to the measuring pipe by adhesive, there is the risk of formation of a void composed of air bubbles and so forth of the adhesive between the transducer and pipe, thereby preventing adequate transmission of ultrasonic waves between the transducer and liquid in the pipe, which again has the risk of causing problems in accurate measurement of flow volume.

SUMMARY OF THE INVENTION

In consideration of the above circumstances, an object of the present invention is to provide an ultrasonic flow meter that is capable of accurately measuring flow volume.

In order to achieve the above object, the present invention provides an ultrasonic flow meter comprising: a measuring pipe through which liquid flows and two measuring units provided on the measuring pipe at an interval in its lengthwise direction, and which measures flow volume by measuring the flow rate of a liquid from the difference in propagation times of ultrasonic waves in both directions between these measuring units; wherein, each measuring unit has a tubular tightly adhered tube of a prescribed thickness made of material having elasticity attached in the state in which it is tightly adhered to the outer peripheral surface of the measuring pipe, and a transducer maintained in the state in which it is pressed against the outer peripheral surface of the tightly adhered tube.

In other words, since the transducer is attached to the tubular tightly adhered tube of a prescribed thickness made of a material having elasticity, which is attached in a tightly adhered state to the outer periphery of the measuring pipe, in a state in which it is pressed against the tightly adhered tube, the transmission of vibrations between the transducer and fluid inside the measuring pipe can be carried out uniformly, and as a result, the occurrence of fluctuations in measurement data, caused by the transducer being fixed unevenly due to variations in thickness of the adhesive or by air bubbles remaining in the adhesive as in the case of attaching the probe to the measuring pipe with adhesive as in the prior art, can be reliably prevented.

In addition, even in the case of, for example, using adhesive and so forth for fixing a tightly adhered tube, the transducer can be fixed to the measuring pipe with a thin layer and small amount of adhesive. This means that variations in thickness associated with the use of adhesive as well as fluctuations in measurement data caused by residual air bubbles and so forth are prevented. In addition, since ultrasonic waves are transmitted to the transducer or emitted from the transducer through a tightly adhered tube, the ultrasonic waves are maintained in a stable state, or in other words, the sensitivity of the transducer is maintained in a suitable state.

In the ultrasonic flow meter of the present invention, it is preferable that the tightly adhered tube is formed so that its inner diameter is smaller than the outer diameter of the measuring pipe.

Namely, since the inner diameter of the tightly adhered tube is formed to be smaller than the outer diameter of the measuring pipe, by spreading open the tightly adhered tube and attaching to the measuring pipe, the inner peripheral surface of the tightly adhered tube can reliably be suitably tightly adhered to the outer peripheral surface of the measuring pipe.

In this manner, since the tightly adhered tube is fixed to the measuring pipe by fastening the tightly adhered tube itself, there is no need to use an adhesive, and even in the case adhesive is used, adhesive can be provided between the tightly adhered tube and measuring pipe in the form of a thin layer of uniform thickness and without the presence of residual air bubbles.

Furthermore, in the ultrasonic flow meter of the present invention, it is preferable that an attachment indentation is formed in the measuring pipe over the peripheral direction, and the tightly adhered tube fits into the attachment indentation.

In this manner, by fitting the tightly adhered tube into attachment indentation formed in the measuring pipe, the tightly adhered tube can be reliably attached to a prescribed position of the measuring pipe in which the transducer is fixed.

Furthermore, the measuring units provided along the lengthwise direction of the measuring pipe are required to be arranged at a prescribed interval in terms of measuring flow volume. Therefore, the interval of the measuring units can be reliably determined by specifying the interval of the attachment indentations. In addition, in the case of producing a plurality of ultrasonic flow meters, the interval between measuring units is maintained constant, thereby resulting in stable product accuracy. In addition, since the position at which the tightly adhered tube fits is specified, assembly work is carried out easily.

Furthermore, in the ultrasonic flow meter of the present invention, it is preferable that an engaging indentation is formed in the measuring pipe over the peripheral direction, and an engaging protrusion is formed on the inner periphery of the tightly adhered tube over the peripheral direction that engages with the engaging indentation, the tightly adhered tube being attached to the measuring pipe by engaging the engaging indentation and the engaging protrusion.

In this manner, by fitting an engaging protrusion formed on the tightly adhered tube into the engaging indentation formed in the measuring pipe, the tightly adhered tube can be reliably attached to a prescribed position of the measuring pipe in which the transducer is fixed.

Here, it is not necessary to fit the entire tightly adhered tube to the measuring pipe. Furthermore, the shape of the engaging indentation formed in the measuring pipe can be changed as desired to match the shape of the engaging protrusion, or the width of the engaging indentation can be formed to be narrower. Making the width of the engaging indentation narrower results in a reduction in the number of positions where the wall thickness of the measuring pipe is decreased, thereby avoiding a decrease in the strength of the measuring pipe.

Furthermore, in the ultrasonic flow meter of the present invention, it is preferable that an engaging protrusion is formed on the measuring pipe over the peripheral direction, and an engaging indentation is formed in the inner periphery of the tightly adhered tube over the peripheral direction that is engaged with the engaging protrusion, the tightly adhered tube being attached to the measuring pipe by engaging the engaging protrusion and the engaging indentation.

In this manner, by fitting the engaging indentation formed in the tightly adhered tube into the engaging protrusion formed on the measuring pipe, the tightly adhered tube can be reliably attached to a prescribed position of the measuring pipe in which the transducer is fixed.

In addition, it is not necessary to fit the entire tightly adhered tube. Furthermore, the shape of the engaging protrusion formed on the measuring pipe can be changed as desired to match the shape of the engaging indentation. By providing the engaging protrusion on the measuring pipe, the wall thickness of the measuring pipe is maintained, thereby making it possible to maintain the strength of the measuring pipe.

Furthermore, in the ultrasonic flow meter of the present invention, it is preferable that the transducer is formed in the shape of a circular arc.

In this manner, by pressing a transducer in the shape of a circular arc onto the outer peripheral surface of a measuring pipe over a tightly adhered tube, the transducer can be evenly attached to the measuring pipe without difficulty.

Furthermore, in the ultrasonic flow meter of the present invention, it is preferable that the transducer is formed in the shape of a ring.

In this manner, by installing the transducer in the shape of a ring on the outer peripheral surface of a measuring pipe over a tightly adhered tube, the transducer can be evenly attached to the measuring pipe without difficulty.

Furthermore, in the ultrasonic flow meter of the present invention, it is preferable that a retaining tube is covered over the outer periphery of the measuring unit that tightly adheres the transducer by pressing against the tightly adhered tube.

In this manner, since the transducer is pressed against the tightly adhered tube by the retaining tube, the transducer can be evenly attached to the measuring pipe as a result of being pressed against the measuring pipe. In addition, this retaining tube protecting the transducer having precise structures from external shock. As a result, the durability and reliability of the ultrasonic flow meter can be improved.

Furthermore, in the ultrasonic flow meter of the present invention, it is preferable that a stepped portion for fitting the above transducer is formed on the tightly adhered tube.

In this manner, the transducer is held in a state in which it is tightly adhered at a prescribed position and without shifting on the outer peripheral surface of the tightly adhered tube. Therefore, the shifting of the transducer is eliminated and accurate measurement of the flow volume can be performed.

Furthermore, in the ultrasonic flow meter of the present invention, it is preferable that protruding walls that surround the transducer and lie between the transducer and the outside are formed on both sides of the tightly adhered tube, and the transducer is attached between the protruding walls.

In this manner, the transducer is partially separated from the outside by the protruding walls, and together with the attachment position of the transducer being clearly indicated, the transducer is protected from external interference. Therefore, it is possible to improve the durability and reliability of the ultrasonic flow meter. Moreover, in the case the interval between these protruding walls is made to be the width of the transducer, shifting of the transducer can be reliably eliminated, thereby enabling accurate measurement of flow volume.

Furthermore, in the ultrasonic flow meter of the present invention, it is preferable that a transducer locking member that presses the transducer against the measuring pipe is attached to the protruding walls.

In this manner, the transducer is pressed towards the measuring pipe side from the back surface by the transducer locking member attached to the tightly adhered tube. Therefore, the transducer can be reliably tightly adhered to a tightly adhered tube, thereby enabling accurate measurement of flow volume. In addition, the transducer can be attached without applying a substance such as an adhesive to the contact surface with the tightly adhered tube.

It is further preferable that the transducer locking member is formed equipped with a contacting portion that makes point or linear contact with the back surface of the transducer.

In this manner, differing from that in which the entire back surface is pressed, the transducer is pressed at a partial contacting portion that makes point or linear contact. As a result of the partial position of the back surface of the transducer is pressed, a pressing force is transmitted throughout the entire transducer and deflection of the transducer is obtained thereby resulting in it being reliably tightly adhered to the tightly adhered tube. Therefore, inclination of the transducer and uneven pressing force are eliminated, thereby making it possible to improve the sensitivity of the transducer and accurately measure flow volume. In addition, even in the case of, for example, applying a substance such as an adhesive between the tightly adhered tube and the transducer, the adhesive film can be obtained having a uniform thickness, thereby enabling accurate measurement of flow volume.

Moreover, since the partial position of the transducer at which pressing force is not applied becomes a free end and is not restrained, vibrations of the transducer are reliably obtained resulting in enhanced sensitivity.

Furthermore, in the ultrasonic flow meter of the present invention, it is preferable that a notch or through hole for suspending a lead wire connected to the above transducer is formed in the wall surface of the protruding walls.

In this manner, as a result of the lead wire connected to the transducer is suspended the notch or through hole provided in the wall surface of a protruding wall, excess space required for wiring the lead wire is eliminated, thereby making it possible to realize conservation of space in the vicinity of the measuring unit. In addition, the lead wires can be protected from external interference. Moreover, as a result of suspending the lead wire in the notch or through hole, the transducer is temporarily restrained and the fixed position of the transducer can be determined, thereby making it possible to perform the assembly work of the ultrasonic flow meter easily. In other words, this functions as an auxiliary means of fixing the transducer.

DESCRIPTION OF THE PREFERRED EMBODIMENTS

The following provides an explanation of the ultrasonic flow meter of the embodiments of the present invention with reference to the drawings.

[First Embodiment]

FIGS. 1 through 4 are drawings that explain an ultrasonic flow meter of a first embodiment. In these drawings, reference symbol 1 indicates an ultrasonic flow meter. This ultrasonic flow meter 1 is formed from a synthetic resin having superior chemical resistance such as vinyl chloride or Teflon, and has a measuring pipe 2 through which liquid flows, and two measuring units 3 provided on this measuring pipe 2 at an interval in its lengthwise direction.

Figure 1:
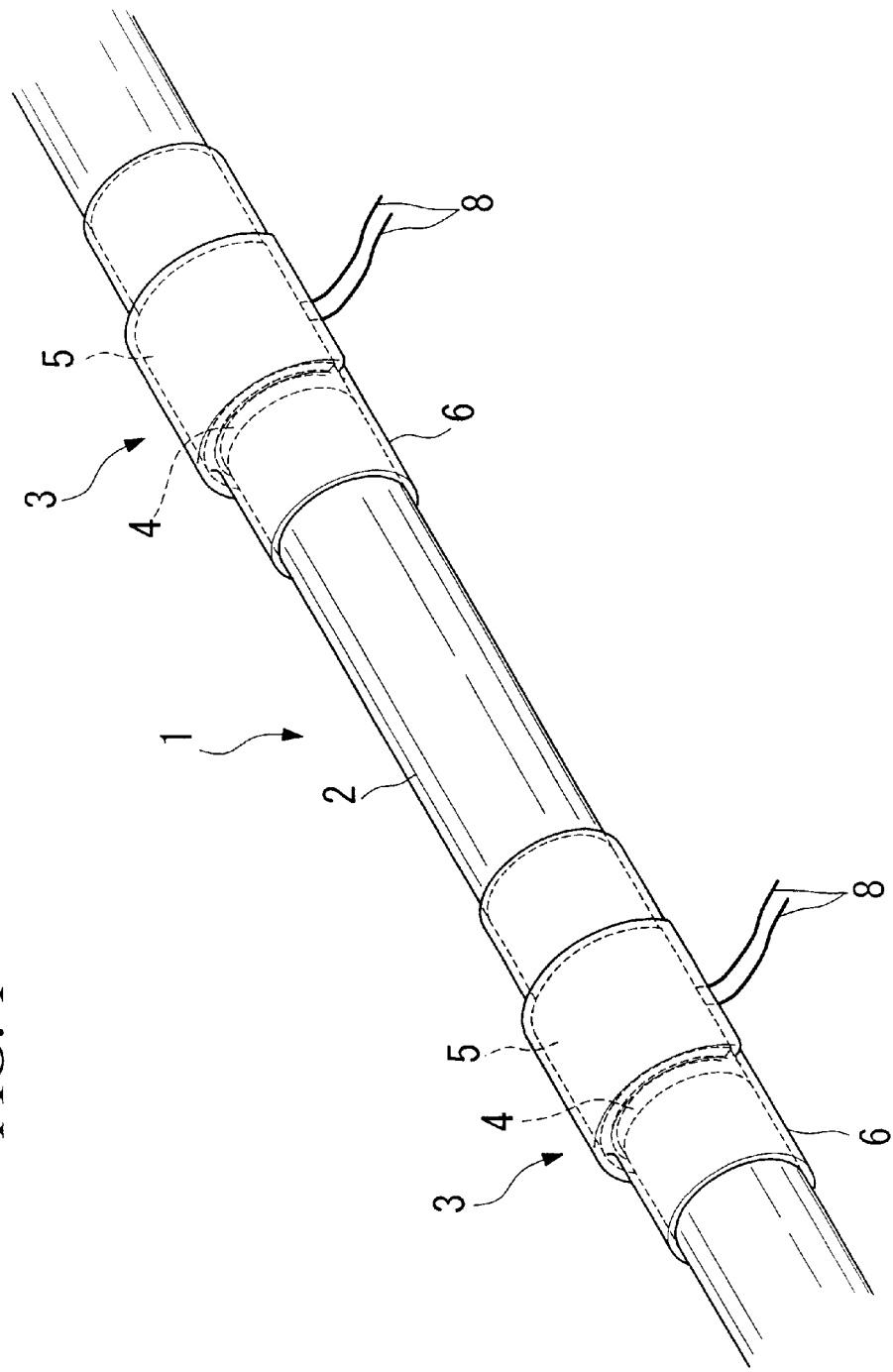
FIG. 1 is a perspective view explaining the structure of an ultrasonic flow meter in a first embodiment of the present invention.
Figure 2:
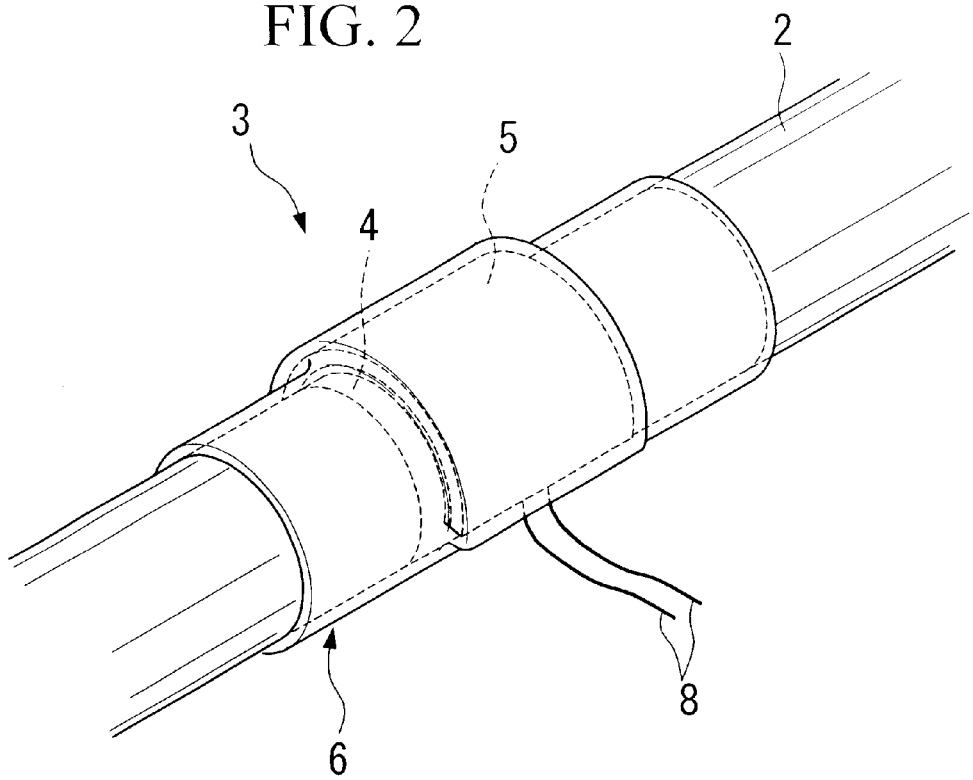
FIG. 2 is a perspective view of a measuring unit that explains the structure of an ultrasonic flow meter in a first embodiment of the present invention.
Figure 3:
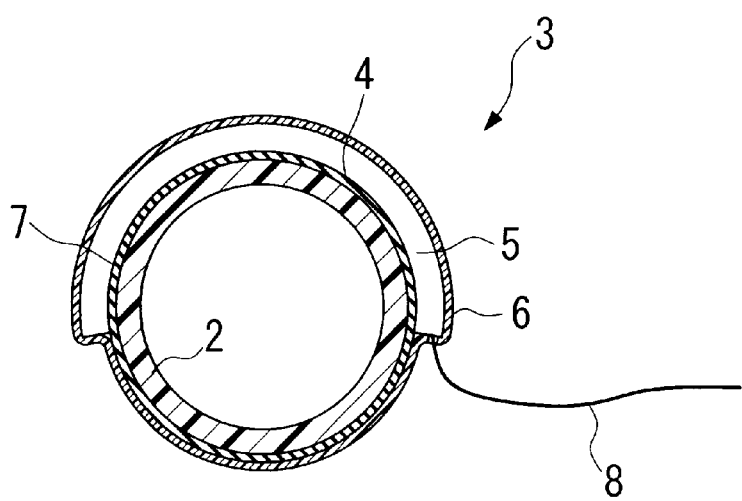
FIG. 3 is a cross-sectional view of a measuring unit that explains the structure of an ultrasonic flow meter in a first embodiment of the present invention.

As shown in FIGS. 2 and 3, each measuring unit 3 is provided on the outer periphery of measuring pipe 2, and is composed of a material having satisfactory elasticity such as silicon rubber. The measuring unit 3 has a tightly adhered tube 4 formed into the shape of a pipe of a prescribed thickness, and a transducer 5 attached in a state in which it is tightly adhered to the surface of the tightly adhered tube 4, and its outer periphery is covered by a retaining tube 6.

Figure 4:
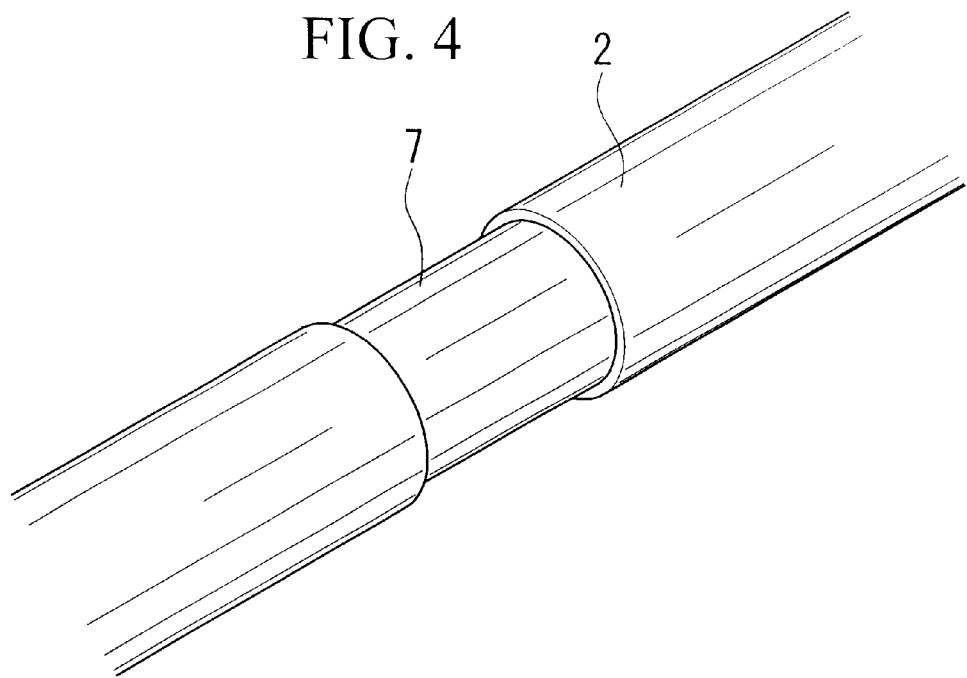
FIG. 4 is a partial perspective view of a measuring pipe that explains the shape of the measuring pipe of an ultrasonic flow meter in a first embodiment of the present invention.

As shown in FIG. 4, an attachment indentation 7 is formed along the peripheral direction on the outer peripheral surface of the measuring pipe 2 in which each measuring unit 3 is fixed, and the tightly adhered tube 4 is fitted into this attachment indentation 7.

Here, the inner diameter of the tightly adhered tube 4 prior to attachment is smaller than the outer diameter of measuring pipe 2 at the attachment indication 7. Thus, by fitting this tightly adhered tube 4 into the attachment indentation 7 of the measuring pipe 2 by spreading open its inner diameter, the inner peripheral surface of tightly adhered tube 4 is reliably tightly adhered in the attachment indentation 7 of the measuring pipe 2 without any gaps in its outer peripheral surface.

The transducer 5, which is in the shape of a circular arc and provided on the outer peripheral surface of the tightly adhered tube 4 tightly adhered to the outer peripheral surface of the measuring pipe 2, is also maintained in a state of being tightly adhered to the outer peripheral surface of the tightly adhered tube 4 by being pressed against the outer peripheral surface of tightly adhered tube 4 by retaining tube 6.

Here, the retaining tube 6, which holds the transducer 5 in a state in which it is pressed against the tightly adhered tube 4, is formed from a synthetic resin having thermal contractility, and is attached in a state in which the transducer 5 is arranged on the outer peripheral surface of the tightly adhered tube 4 so as to cover the attached position of the transducer 5. By then applying heat in the state in which the retaining tube 6 is covered, thermal contraction takes place and the transducer 5 is pressed against the tightly adhered tube 4 and held in a tightly adhered state by the thermally contracted retaining tube 6.

Furthermore, reference symbol 8 in the drawings indicates lead wires connected to the transducer 5.

In this manner, according to the ultrasonic flow meter 1 having the above structure, since the transducer 5 is attached in a state in which it is pressed against the tightly adhered tube 4 made of an elastic material and attached in a tightly adhered state to the outer peripheral surface of the measuring pipe 2, the transmission of vibrations between the transducer 5 and the liquid inside measuring pipe 2 can be carried out uniformly. Therefore, measurement of flow volume can be carried out accurately by being able to reliably prevent the occurrence of fluctuations in measurement data caused by the transducer being fixed unevenly due to variations in the thickness of adhesive or by residual air bubbles being present in the adhesive as in the case of directly attaching the transducer by adhesive as in the prior art.

Moreover, by fitting the tightly adhered tube 4 into the attachment indentation 7 formed in the measuring pipe 2, the tightly adhered tube 4 can be reliably attached at a prescribed position of the measuring pipe 2.

Moreover, since the inner diameter of the tightly adhered tube 4 is formed to be smaller than the outer diameter of the attachment indentation 7 of the measuring pipe 2, by attaching the tightly adhered tube 4 to measuring pipe 2 by spreading it open, the inner peripheral surface of tightly adhered tube 4 can be reliably and satisfactorily tightly adhered to the outer peripheral surface of the measuring pipe 2.

In addition, the position of the measuring unit 3 can be determined by the attachment indentation 7, thereby making it possible to simplify assembly work and provide the arrangement of measuring units at prescribed positions without error. As a result, even in the case of mass production of the ultrasonic flow meter, a plurality of ultrasonic flow meters can be provided that are capable of performing accurate and stable measurement of flow volume.

Figure 5:
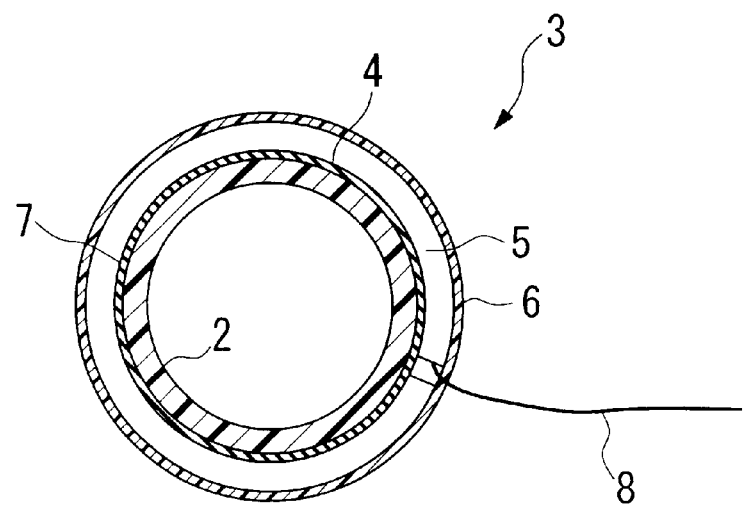
FIG. 5 is a cross-sectional view of a measuring unit that explains a variation of the ultrasonic flow meter in a first embodiment of the present invention.

Furthermore, although an explanation was provided of the ultrasonic flow meter 1 that uses transducers in the shape of a circular arc in the above example, as shown in FIG. 5, a ring-shaped transducer 5 may also be engaged with the outer periphery of the tightly adhered tube 4 by tightly adhering its inner peripheral surface to the tightly adhered tube 4.

In addition, although an explanation has been provided in which the shape of the outer peripheral surface of the tightly adhered tube 4 is smooth, a protrusion(s) or indentation(s) that matches the shape of the transducer 5 may be formed in this outer peripheral surface, and the transducer 5 may be tightly adhered and fixed by fitting into said stepped portion. According to this, shifts in the peripheral direction of the transducer 5 as well as shifts in the axial direction can be suppressed without covering with the retaining tube 6.

[Second Embodiment]

Figure 6A:
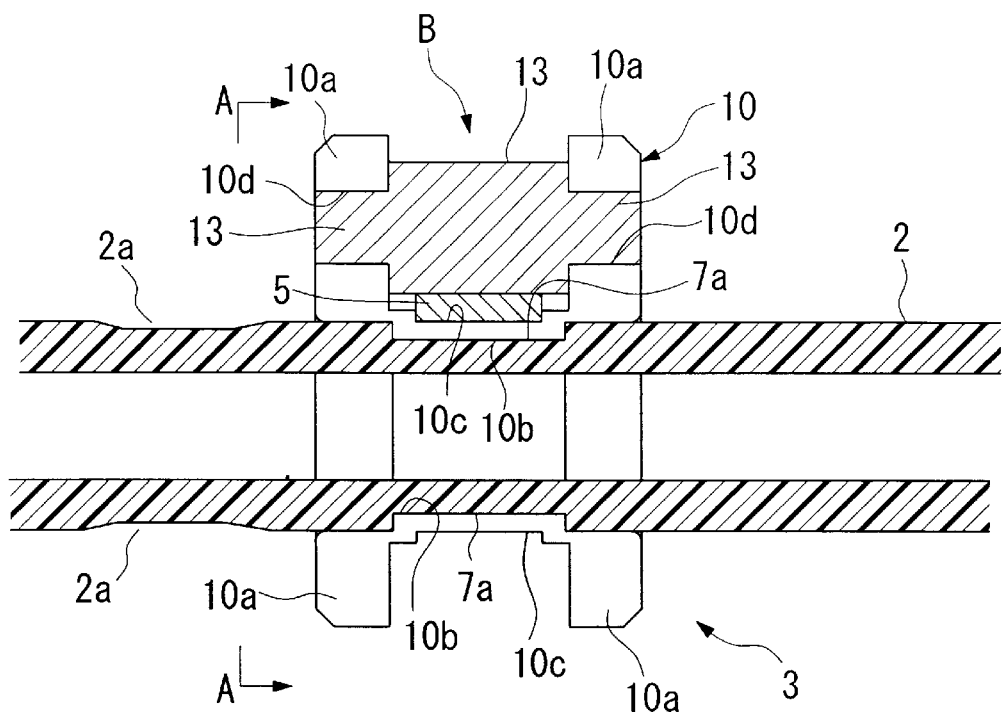
FIG. 6A is a cross-sectional view as viewed from the cross-section along the axial direction of the measuring pipe for explaining the structure of an ultrasonic flow meter in a second embodiment of the present invention.
Figure 6B:
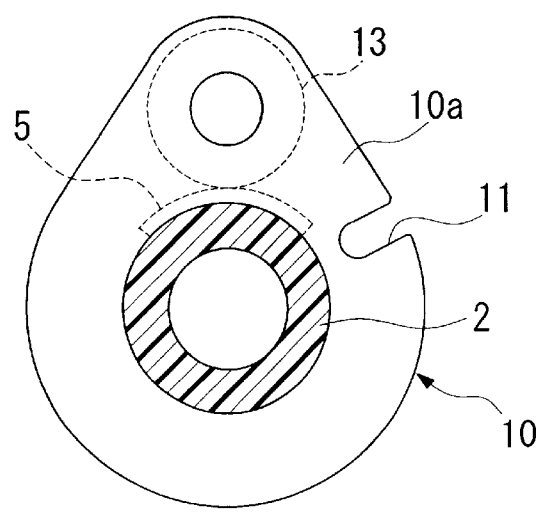
FIG. 6B is a partial cross-sectional view as viewed from the cross-section perpendicular to the axis of the measuring pipe as viewed from arrows A in FIG. 6A for explaining the structure of an ultrasonic flow meter in a second embodiment of the present invention.

Next, an explanation is provided of an ultrasonic flow meter in a second embodiment using FIGS. 6A and 6B. FIG. 6A shows a cross-sectional view in the axial direction of the measuring unit 3, while FIG. 6B shows a partial cross-sectional view taken along arrows A of FIG. 6A.

In the drawings, reference symbol 10 in FIG. 6A indicates a tightly adhered tube, which together with being equipped with protruding walls 10a on both the left and right sides, tightly adheres and holds the transducer 5 in the shape of a circular arc by fitting it between the protruding walls 10a on both sides, and has the same function as the tightly adhered tube 4 shown in the first embodiment.

In addition, reference symbol 13 indicates a transducer locking member that presses against the transducer 5 tightly adhered to the tightly adhered tube 10 from the outside.

The tightly adhered tube 10 is made from a material having satisfactory elasticity such as silicon rubber in the same manner as the first embodiment, and together with being formed into the shape of a cylinder of a prescribed thickness, and protruding walls 10a, which protrude towards the outside, are respectively formed on the ends located in the lengthwise direction of the measuring pipe 2 on both sides.

Moreover, stepped portion 10c for the fitting transducer 5 is formed in an indentation B formed around the protruding walls 10a on both sides, and the width of the stepped portion 10c is formed to match the width of the transducer 5.

In addition, these protruding walls 10a have an egg shape formed by having a partially higher height relative to the axial direction of the measuring pipe 2 so that the opposing faces overlap, and holes 10d are respectively formed in the protruding walls 10a having this higher height to be mutually coaxial and in parallel with the axial direction of the measuring pipe 2.

Moreover, as shown in FIG. 6B, a lead wire guide hole (notch) 11 in which the lead wires 8 (see FIGS. 1 through 3) are provided therein is formed in the side of the protruding walls 10a, and fulfills the role for leading an intermediate portion of the lead wires 8 until it is connected to the outside.

The lead wire guide hole 11 leads lead wires 8 that are connected to the transducer 5 as mentioned above, and fulfills the role of restraining the lead wires 8 in a simplified manner. As a result of restraining the lead wires 8, the position of the transducer 5 is maintained at the attachment position of the tightly adhered tube 10 in that state, and for example, in the case of fixing the transducer 5 with adhesive, the lead wire guide hole 11 fulfills the role for supporting the transducer 5 at the prescribed position until the adhesive hardens.

An engaging protrusion 10b that engages with an after-mentioned engaging indentation 7a formed at the attachment position of the measuring unit 3 of the measuring pipe 2 is formed on the inner peripheral surface of the tightly adhered tube 10. In other words, the inner peripheral surface of the tightly adhered tube 10 is partially in the shape of a protrusion, and employs a different shape than the case of the tightly adhered tube 4 being entirely fit into the measuring pipe 2 as indicated in the first embodiment.

The transducer locking member 13 has the shape of a column, and locking protrusions 13a and 13b formed on both of its ends are respectively fixed on holes 10d of both protruding walls 10a of the tightly adhered tube 10 described above.

A gap for providing the transducer 5 is formed between the transducer locking member 13 and tightly adhered tube 10, and the transducer locking member 13 presses against the transducer 5 from the back side when the transducer 5 is arranged in this gap. Thus, the outer diameter of the transducer locking member 13 is formed in consideration of the dimension of thickness of the transducer 5.

Since the back surface of the transducer 5 and the outer peripheral surface of the transducer locking member 13 are mutually contacted by two curved surfaces thereof, a linear contact portion in parallel with the axial direction of the measuring pipe 2 is formed between the back surface of the transducer 5 and the outer peripheral surface of the transducer locking member 13.

As a result, the central portion in the peripheral direction of the transducer 5 is pressed on by the tightly adhered tube 10, and this pressing force is transmitted over the peripheral direction of the transducer 5. This transmitted force then acts to deflect the transducer 5 and tightly adheres it to the tightly adhered tube 10 over the transducer 5 entirely.

Moreover, since both sides excluding the central portion of the transducer 5 in the peripheral direction are free ends, vibrations produced by ultrasonic waves can be reliably received together with the tightly adhered tube 10 with which it makes contact. In other words, sensitivity is increased by partially holding down the transducer 5.

As described above, at the attachment position of the measuring unit 3 of the measuring pipe 2, the engaging indentation 7a is formed over the peripheral direction, and the engaging protrusion 10b of the tightly adhered tube 4 is fitted into this engaging indentation 7a. In other words, in comparison with the attaching indentation 7 shown in the first embodiment previously described, the engaging indentation 7a is formed to a size that matches the engaging protrusion 10a formed on the inner periphery, and does not have a size that engages with the entire width of the tightly adhered tube 10.

In addition, the inner diameter of the tightly adhered tube 10 at the inner periphery of the portion of the engaging protrusion 10b, which is its smallest inner diameter, is formed to be smaller than the outer diameter of the measuring pipe 2.

Thus, in the case of this tightly adhered tube 10, by spreading open the inner diameter of the engaging protrusion 10b and fitting into the engaging indentation 7a of the measuring pipe 2, the engaging protrusion 10b formed on the inner peripheral surface of the tightly adhered tube 10 is reliably tightly adhered to the engaging indentation 7a of the measuring pipe 2 without forming a gap in the outer peripheral surface.

Similar to the attaching indentation 7 shown in the first embodiment, the distance between each measuring unit 3 is reliably determined by the engaging indentations 7a formed in the measuring pipe 2. As a result, accurate flow volume can be measured.

In the case of mass producing the highly accurate ultrasonic flow meter 1, it is necessary to make the interval between the measuring units 3 fixed without variation, and this is realized by the engaging indentations 7a defining that interval. In addition, during assembly, the engaging protrusion 10b is simply required to be attached in the engaging indentation 7a, thereby enabling assembly work to be carried out easily.

Furthermore, in order to reliably transmit ultrasonic waves between the transducer 5 and the measuring pipe 2, it is preferable to interpose a gel-like substance between the tightly adhered tube 10 and the measuring pipe 2. Therefore, in the present embodiment, the above gel-like substance is employed, and in order to promote even greater sealing to the tightly adhered tube 10, an adhesive in gel form is used.

The adhesive is applied between the engaging protrusion 10b and the engaging indentation 7a, and fixed by allowing to dry in a vacuum chamber under a vacuum. As a result, the air bubbles entrapped in the adhesive are drawn out to the vacuum and removed from the adhesive resulting in drying in a gel-like state. Thus, a film consisting of the gel-like adhesive, which is free of residual air bubbles and uniformly interposed in the form of a thin layer, is formed between the tightly adhered tube and the measuring pipe 2.

Furthermore, the process for drying the adhesive in a vacuum chamber is carried out after the assembly of the measuring unit 3 in which the transducer 5 is attached to the outer periphery of the tightly adhered tube 10 is finished. Consequently, air bubbles formed in the case of interposing and fixing a gel-like adhesive between the transducer 5 to be described later and the tightly adhered tube 10, as well as air bubbles that have become entrapped between the adhesive and the tightly adhered tube 10 as well as between the adhesive and measuring pipe 2, etc., being completely removed. Thus, since air bubbles are eliminated between the transducer 5 and the liquid in the measuring pipe, the emitted state of the ultrasonic waves as well as the reception sensitivity are enhanced.

Furthermore, in this embodiment, a reduced outer diameter portion 2a, in which the outer diameter becomes smaller in the vicinity of the engaging indentations 7a, is formed in the measuring pipe 2. This reduced outer diameter portion 2a is formed in the outer peripheral portion of the measuring pipe 2 at the suitable position between the end of the measuring pipe 2 where the tightly adhered tube 10 is inserted and the position where the measuring unit 3 is fixed, and in FIG. 6A, is located to the left of the engaging indentations 7a.

When attaching the tightly adhered tube 10 to the position where the measuring unit 3 is fixed, the tightly adhered tube 10 is moved from the end of the measuring pipe 2 and passes the reduced outer diameter portion 2a. When the tightly adhered tube 10 reaches the reduced outer diameter portion 2a, since the inner diameter of the tightly adhered tube 10 is larger than the outer diameter of the reduced outer diameter portion 2a, a gap is formed between the tightly adhered tube 10 and the reduced outer diameter portion 2a. And then, by pouring an adhesive into this gap, adhesive is coated onto the inner peripheral surface of the tightly adhered tube 10, and the tightly adhered tube 10 coated with this adhesive is moves to the engaging indentations 7a side.

As a result, since the tightly adhered tube 10 is away from the reduced outer diameter portion 2a, the gap in which adhesive is coated gradually becomes narrower due to the outer diameter of the measuring pipe 2. As a result, adhesive is gradually spread out in the form of a thin film.

Consequently, the gel-like adhesive formed in the form of the thin film can be interposed between the tightly adhered tube 10 and the measuring pipe 2 without containing air bubbles.

Furthermore, in this embodiment, in order to reliably fix the transducer locking member 13 to the transducer 5, the gel-like adhesive is further coated onto the back surface of the transducer 5. This is carried out for the purpose of ensuring the durability and reliability of the ultrasonic flow meter 1 by preventing the removal of the transducer locking member 13 from the tightly adhered tube 10 when the distance between the protruding walls 10a is spread due to the flexibility of the tightly adhered tube 10.

Moreover, as described above, the gel-like adhesive may be coated between the transducer 5 and the tightly adhered tube 10. In this case, the fixation of the transducer 5 is carried out by the adhesive being spread to the thin film of uniform thickness due to the pressing force resulting from attaching the transducer locking member 13. As a result, accurate measurement data can be obtained even in the case of fixing the transducer 5 using the adhesive.

However, the composition in which the gel-like adhesive explained above is used for indicating one example of the present embodiment, and the application of the adhesive is not necessarily required.

According to the ultrasonic flow meter 1 of the above structure, since the transducer 5, which is attached in a state in which it is pressed on by the transducer locking member 13, is attached to the tubular tightly adhered tube 10 of the prescribed thickness made of an elastic material that is attached in a state in which it is tightly adhered to the outer peripheral surface of the measuring pipe 2, the transmission of vibrations between the transducer 5 and liquid inside the measuring pipe 2 can be carried out uniformly. Therefore, the occurrence of fluctuations in the measurement data can be reliably prevented, and the measurement of flow volume can be carried out accurately. In addition, even in the case of using the adhesive as in the prior art, the occurrence of fluctuations in measurement data can also be reliably prevented since there is no variation in the thickness of the adhesive.

Moreover, by fitting the engaging protrusion 10a of the tightly adhered tube 10 into the engaging indentation 7a formed in measuring pipe 2, the tightly adhered tube 10 can be reliably attached to the prescribed position of the measuring pipe 2, and the measurement interval can be reliably determined, thereby resulting in improved measurement accuracy. Furthermore, the ultrasonic flow meter 1 can be assembled with simple processes.

In addition, since the protruding walls 10a are formed so as to surround the transducer 5, transducer 5 can be protected from external interference.

Moreover, in the process of fixing the transducer 5, the transducer 5 can be temporarily attached by restraining the lead wires 8, thereby facilitating positioning and fixing of the transducer 5.

Furthermore, although the composition was shown in the above-mentioned example in which the engaging indentation 7a is formed in the measuring pipe 2 and the engaging protrusion 10b is formed on the tightly adhered tube 10, the engaging protrusion may be formed in the fixed portion of the measuring unit 3 of the measuring pipe 2, and the engaging protrusion may be formed in the tightly adhered tube 10.

In addition, although the lead guide hole 11 was shown in the form of being cut out from the outside, a through hole that is bored in the protruding walls 10a may also be formed as the lead guide hole. In this case, the lead wires 8 are inserted into the lead guide hole in the form of the through hole from the end on the opposite side of the position where they are connected with the transducer 5 so as to be suspend by the lead guide hole, thereby enhancing the restraint of the lead wires 8.

What is claimed is:

1. An ultrasonic flow meter comprising:

a measuring pipe through which liquid flows; and two measuring units provided on said measuring pipe at an interval in its lengthwise direction, and which measures flow volume by measuring the flow rate of said liquid from the difference in propagation times of ultrasonic waves in both directions between these measuring units; wherein, said measuring units respectively have a tubular tightly adhered tube of a prescribed thickness having an inner diameter which is smaller than an outer diameter of said measuring pipe; the tubular tightly adhered tube is unitedly made of material having elasticity attached in the state in which it is tightly adhered to an outer peripheral surface of said measuring pipe, and a transducer maintained in the state in which it is pressed against the outer peripheral surface of said tightly adhered tube.

2. An ultrasonic flow meter according to claim 1, wherein an attachment indentation is formed in said measuring pipe over the peripheral direction, and said tightly adhered tube fits into said attachment indentation.

3. An ultrasonic flow meter according to claim 1, wherein an engaging indentation is formed in said measuring pipe over the peripheral direction, and an engaging protrusion is formed on the inner periphery of said tightly adhered tube over the peripheral direction that engages with said engaging indentation, said tightly adhered tube being attached to said measuring pipe by engaging said engaging indentation and said engaging protrusion.

4. An ultrasonic flow meter according to claim 1, wherein an engaging protrusion is formed on said measuring pipe over the peripheral direction, and an engaging indentation is formed in the inner periphery of said tightly adhered tube over the peripheral direction that is engaged with said engaging protrusion, said tightly adhered tube being attached to said measuring pipe by engaging said engaging protrusion and said engaging indentation.

5. An ultrasonic flow meter according to claim 1, wherein said transducer is formed in a shape of a circular arc.

6. An ultrasonic flow meter according to claim 1, wherein said transducer is formed in a shape of a ring.

7. An ultrasonic flow meter according to claim 1, wherein a retaining tube is covered over the outer periphery of said measuring unit that tightly adheres said transducer by pressing against said tightly adhered tube.

8. An ultrasonic flow meter according to claim 1, wherein a stepped portion for fitting said transducer is formed on said tightly adhered tube.

9. An ultrasonic flow meter according to claim 1, wherein protruding walls that surround said transducer and lie between said transducer and the outside are formed on both sides of said tightly adhered tube; and said transducer is attached between said protruding walls.

10. An ultrasonic flow meter according to claim 9, wherein a transducer locking member that presses said transducer against said measuring pipe is attached to said protruding walls.

11. An ultrasonic flow meter according to claim 10, wherein said transducer locking member is formed equipped with a contacting portion that makes point or linear contact with the back surface of said transducer.

12. An ultrasonic flow meter according to claim 9, wherein a notch or through hole for suspending a lead wire which is connected to said transducer is formed in the wall surface of said protruding walls.

* * * * *